United States Patent [19]
Akeel et al.

[11] Patent Number: 5,272,805
[45] Date of Patent: Dec. 28, 1993

[54] SYSTEM FOR THE FLEXIBLE ASSEMBLY OF ASSEMBLIES

[75] Inventors: Hadi A. Akeel, Rochester Hills; Lane A. Hautau, Utica, both of Mich.

[73] Assignee: FANUC Robotics North America, Inc., Auburn Hills, Mich.

[21] Appl. No.: 949,441

[22] Filed: Sep. 22, 1992

Related U.S. Application Data

[62] Division of Ser. No. 678,596, Apr. 1, 1991, abandoned.

[51] Int. Cl.$^5$ .............................................. B23P 19/04
[52] U.S. Cl. ........................................ 29/712; 29/771; 29/791
[58] Field of Search ............... 29/281.5, 281.6, 407, 29/429, 430, 445, 466, 469, 563, 709, 711, 712, 771, 791, 822; 269/45, 266, 296; 318/568.13–568.18; 364/468, 478; 901/15, 42

[56] References Cited

U.S. PATENT DOCUMENTS

| | | | |
|---|---|---|---|
| 4,589,184 | 5/1986 | Asano et al. | 29/430 |
| 4,736,515 | 4/1988 | Catena | 29/430 X |
| 5,125,149 | 6/1992 | Inaba et al. | 29/771 X |

*Primary Examiner*—Mark Rosenbaum
*Assistant Examiner*—Peter Dungba Vo
*Attorney, Agent, or Firm*—Brooks & Kushman

[57] ABSTRACT

A method and system for the flexible assembly of components into an assembly at an assembly station within an assembly area in an adaptive, programmable fashion. Several programmable locators mounted on a platform work cooperatively to receive and support components or parts having critical positioning features at approximate locations. The programmable locators then move the components so that the critical positioning features and hence the components are at desired locations. Thereafter, part position and orientation are constrained at retaining locations while the components are in their desired locations. Processing equipment at least partially joins the retained components either at the assembly station or at a separate processing station. One of the programmable locators may provide one of the retaining locations. Preferably, at least one sensor mounted on one of the programmable locators provides at least one feedback signal for a control means which controls at least one programmable locator to adapt its position with respect to at least one critical feature of its part to thereby relocate the part. In this way, verification of the accuracy of the positioning and holding is provided.

32 Claims, 8 Drawing Sheets

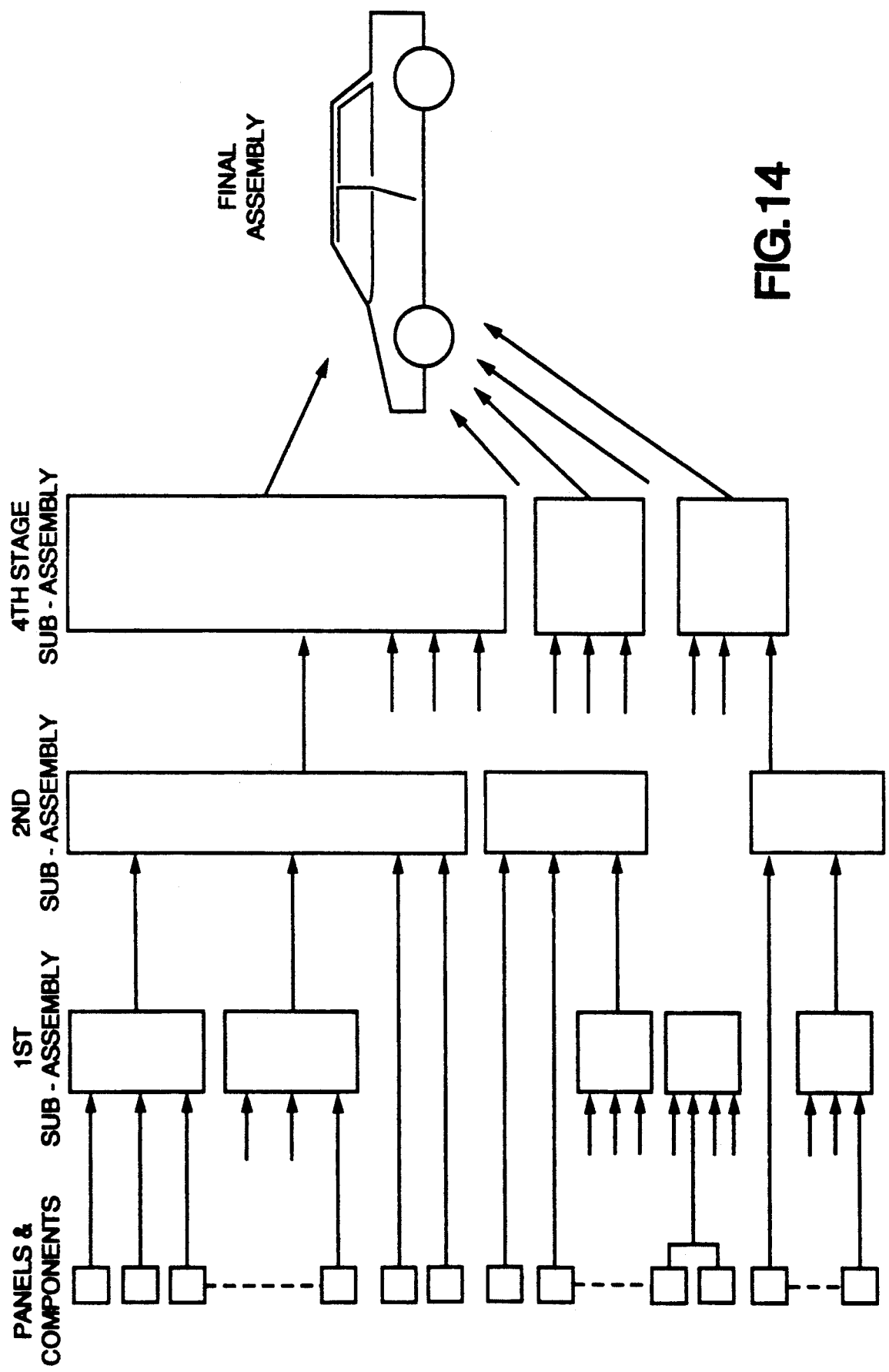

SYSTEM FOR THE FLEXIBLE ASSEMBLY OF ASSEMBLIES

This is a divisional of copending application(s) Ser. No. 07/678,596 filed on Apr. 1, 1991 now abandoned.

TECHNICAL FIELD

This invention relates to a method and a system for the flexible assembly of components into an assembly. The method and system as described below apply to the fabrication of subassemblies from body panel components and the further fabrication of larger subassemblies from groups of smaller subassemblies, panels and other components. A further application of the method and system of the present invention is the final assembly of the full car body from larger subassemblies.

BACKGROUND ART

The predominate approach today to introduce factory automated technology into manufacturing is to selectively apply automation and to create islands of automation. The phrase "islands of automation" has been used to describe the transition from conventional or mechanical manufacturing to the automated factory. Interestingly, some appear to use the phrase as though it were a worthy end object. On the contrary, the creation of such islands can be a major impediment to achieving an integrated factory.

Manufacturing examples of islands of automation often include numerically controlled machine tools; robots for assembly, inspection, painting, and welding; lasers for cutting, welding and finishing; sensors for test and inspection; automated storage/retrieval systems (AS/RS) for storing work-in-process, tooling and supplies; smart carts monorails, and conveyors for moving material from work station to work station; automated assembly equipment and flexible machining systems. Such islands are often purchased one at a time and justified economically by cost reductions. An example of an AS/RS system is disclosed in the U.S. Pat. No. to Loomer 4,328,422. A different type of AS/RS system and control system therefor is disclosed in the U.S. Pat. No. to Tapley 4,232,370.

To integrate the islands of automation, it is necessary to link several machines together as a unit. For example, a machine center with robots for parts loading and unloading can best be tied to visual inspection systems for quality control. Computer numerical control machine tools can all be controlled by a computer that also schedules, dispatches, and collects data. Selecting which islands to link can be most efficiently pursued on the basis of cost, quality and cycle time benefits.

In some cases, the islands of automation will be very small (e.g. an individual machine or work station). In other cases, the islands might be department-sized. The U.S. Pat. No. to Kawano 4,611,749 discloses the use of robots to transfer parts between such islands which are relatively close to each other.

From a systems viewpoint, islands of automation are not necessarily bad, so long as they are considered to be interim objectives in a phased implementation of an automated system. However, to obtain an integrated factory system, the islands of automation must be tied together or synchronized. Systems synchronization frequently occurs by way of a material-handling system; it physically builds bridges that join together the islands of automation. Early examples of such islands of automation linked together by a material-handling system are disclosed in the U.S. Pat. Nos. to Williamson 4,369,563 and Lemelson 3,854,889.

The '563 patent discloses a system including machine tools which perform machining operations on workpieces loaded on pallets. The pallets are delivered to the machine tools from a storage rack by transporters. The workpieces are manually loaded onto the pallets.

The '889 patent discloses a system including workholding carriers which are selectively controlled in their movement to permit work to be transferred to selected machine tools while bypassing other machine tools.

Automated material handling has been called the backbone of the automated factory. Other than the computer itself, this function is considered by many automation specialists as the most important element in the entire scenario of automated manufacturing. It is the common link that binds together machines, workcells, and departments into a cohesive whole in the transformation of materials and components into finished products. For example, the U.S. Pat. No. to Sekine et al 4,332,012 discloses a control system for assembly lines for the manufacture of different models of automotive vehicles. Temporary storage is provided between assembly steps by a storage section.

To date, one of the major applications for industrial robots has been material handling. Included here are such tasks as machine loading and unloading; palletizing/depalletizing; stacking/unstacking; and general transfer of parts and materials—for example, between machines or between machines and conveyors. An example of one such application is disclosed in the U.S. Pat. No. to Kenmochi 4,519,761. The '761 patent discloses a combined molding and assembling apparatus wherein a pallet is conveyed by a conveyor. Resin components are carried by the pallet for use in the molding and assembling operation.

Robots are often an essential ingredient in the implementation of Flexible Manufacturing Systems (FMS) and the automated factory. Early examples of the use of robots for assembling small parts is disclosed in the U.S. Pat. Nos. to Engelberger et al 4,163,183 and 4,275,986 wherein robots are utilized to assemble parts from pallets onto a centrally located worktable.

The automated factory may include a variety of material transportation devices, ranging from driver-operated forklifts to sophisticated, computer-operated, real-time reporting with car-on-track systems and color graphics tracking. These material transport systems serve to integrate workcells into FMS installations and to tie such installation and other workcells together for total factory material transport control.

With all of their versatility, robots suffer from a limitation imposed by the relatively small size of their work envelope, requiring that part work fixtures and work-in-process be brought to the robot for processing. Complete integration of the robot into the flexible manufacturing system requires that many parts and subassemblies be presented to the robot on an automated transport and interface system. For example, installation of an assembly robot without an automated transport system will result in an inefficient island of automation needing large stores of work-in-process inventory for support, which are necessary to compensate for the inefficiencies of manual and fork truck delivery.

An example of the use of robots in a manufacturing assembly line is disclosed in the U.S. Pat. No. to Abe et al 4,611,380. The '380 patent also discloses the use of a bar code to identify the components to be assembled to a base component to control the assembly operations.

The U.S. Pat. No. to Suzuki et al 4,616,411 discloses a fastening apparatus including a bolt receiving and supply device for use in the automated assembly of a door to a vehicle.

The handling, orienting and feeding of parts as they arrive from vendors are formidable jobs which must be done prior to robotic assembly since, in general, all such parts require reorienting for the assembly robot. The U.S. Pat. No. to Kohno et al 4,527,326, for example, discloses a vibratory bowl which feeds parts to an assembly robot. A vision system enables the robot to properly pick up the parts from the bowl.

Part feeding is a technology that generally has lagged behind the advanced automation system it supports. However, in general, part feeding curtails flexibility, increases costs, increases floor space requirements and lengthens concept-to-delivery time. For maximum flexibility, a minimum amount of tooling should be considered. On the other hand, additional tooling can be used effectively to "buy time" by assisting the robot. Typically, dedicated hardware—bowl feeders, magazines, pallets—is required to feed parts to the robot. Unlike the robot, dedicated hardware is not easily reusable and therefore is less economical for medium-volume applications.

The U.S. Pat. No. to Suzuki et al 4,383,359 discloses a part feeding and assembly system, including multiple stage vibration and magazine feeders. A robot is utilized to change the position of the fed parts for assembly on a chassis supported on a line conveyor. The robot operates in combination with a vision system to reorient the parts.

Neither flexible nor sophisticated, part feeding equipment is usually constructed by highly skilled artisans working with welding torch and hammer in small specialized shops. The most common and most inexpensive feeding method—vibratory bowl feeding—provides the builder with a versatile base easily modified to handle many different parts which are not delicate and which are substantially identical. Delicate parts or parts that tangle, such as motors, are better fed by magazines or trays for exact orientation.

Also, not all parts, for example, can be bowl fed. For most parts, the overriding concern is geometry and, in particular, symmetry. If a part is either symmetric or grossly asymmetric, then vibratory bowl feeding will be easier and more efficient.

Robots may load and unload workpieces, assemble them on the transport, inspect them in place or simply identify them. The kind of activity at the robot or machine and material transport system interface dictates the transport system design requirements. One of the design variables relating to the interface includes accuracy and repeatability of load positioning (in three planes). Also, care in orienting the workpiece when it is initially loaded onto the transport carrier will save time when the work is presented to the robot or the tool for processing. Proper orientation of the part permits automatic devices to find the part quickly without "looking" for it and wasting time each time it appears at the workstation.

Fixtures may be capable of holding different workpieces, reducing the investment required in tooling when processing more than one product or product style on the same system.

The transport system must be capable of working within the space limitations imposed by building and machinery configurations, yet must be capable of continuous operation with the loads applied by a combination of workpiece weight, fixture weight, and additional forces imposed by other equipment used in the process.

The system must also have the ability to provide queuing of parts at the workstation so that a continuous flow of work is maintained through the process. Automatic queuing of transport carriers should provide gentle accumulation without part or carrier damage.

The primary impediment to robotic assembly is economic justification. When the cost of robotic assembly is compared against traditional manual methods or high volume dedicated machinery, robots oftentimes lose out. On one side of the spectrum are the high-volume, high-speed applications where hard automation is used. It's difficult for robots to compete in that environment. On the other side are the low-volume, high variety products that are assembled manually. Robots may lack the dexterity to perform these jobs, and they may cost more than relatively low-paid manual assemblers. There is a middle ground between these two extremes for flexible assembly. Many believe that the best approach is a combination of robots, dedicated equipment and manual assembly.

While assembly is one of the most difficult areas of robotic application, many say it also holds the most promise. Assembly robots offer an array of benefits that cannot be ignored. They can produce products of high and consistent quality, in part because they demand top-quality components. Their reprogrammability allows them to adapt easily to design changes and to different product styles. Work-in-process inventories and scrap can be reduced. Therefore, it is important that the materials transport system serving the robots be capable of quickly moving into position with parts, then quickly moving out of the workstation and on to downstream stations. Prompt transporter movements between stations allow work-in-process inventory to be minimized. Batch sizes are smaller and work faster with only a minimum of queuing at each workstation.

The U.S. Pat. No. to Yamamoto 4,594,764 discloses an automatic apparatus and method for assembling parts in a structure member such as an instrument panel of an automobile. A conveyor conveys a jig which supports the panel to and from assembly stations. Robots mount the parts on the instrument panel at the assembly stations. Robots are provided with arm-mounted, nut-driving mechanisms supplied from vibratory parts bowls.

A link for tying together some of the independently automated manufacturing operations is the automatic guided vehicle system (AGVS). The AGVS is a relatively fast and reliable method for transporting materials, parts or equipment, especially when material must be moved from the same point of origin to other common points of destination. Guide path flexibility and independent, distributed control make an AGVS an efficient means of horizontal transportation. As long as there is idle space and a relatively smooth floor to stick guide wires or transmitters into, the AGVS can be made to go there.

As an alternative to traditional conveying methods, the AGVS provides manufacturing management with a centralized control capability over material movement. Also, the AGVS occupies little space compared with a conveyor line. Information available from the AGVS also provides management with a production monitoring data base. The U.S. Pat. No. to Mackinnon et al 4,530,056 discloses an AGVS system including a control system for controlling the individual vehicles.

Robot installations for transporter interface can be grouped into three principal categories: (1) stationary robots, (2) moving (i.e. mobile) robots (on the floor or overhead), and (3) robots integral with a machine. The moving robots subdivide into two types. First are stationary robots, mounted on a transporter to move between work positions to perform welding, inspection, and other tasks. The second type of moving robot is the gantry unit that can position workpieces weighing more than one ton above the workcells and transport system. The system only has to deliver and pick somewhere under the span of gantry movement.

End effectors used in material handling include all of the conventional styles—standard grippers, vacuum cups, electromagnets—and many special designs to accommodate unusual application requirements. Dual-purpose tooling is often used to pick up separators or trays, as well as the parts being moved through the system.

Vacuum-type grippers and electromagnetic grippers are advantageous because they permit part acquisition from above rather than from the side. This avoids the clearance and spacing considerations that are often involved when using mechanical grippers.

However, the use of vacuum and electromagnetic grippers is not without its problems since cycle time is not just a function of robot speed and its accelerating-/decelerating characteristics. Cycle time is dependent on how fast the robot can move without losing control of the load. Horizontal shear forces must be considered in the application of these grippers. This often means that the robot is run at something less than its top speed.

Currently, automotive body assembly utilizes fixtures on which body panels ar placed relative to each other in a predefined relative location. The relative location is determined by location points which supports the panel and confines its location to the desired position. Location points are usually comprised of hard stops against which the panels are clamped, or closely confined within acceptable tolerances.

The location points must be adjusted to the correct location relative to adjacent panels and components, within necessary tolerances, before the panels and components are joined by process equipment. To attain the necessary level of accuracy, it is usually necessary to make manual adjustments to the confining clamps by shimming and the like. The adjustment must also be verified by high accuracy measurements. The whole process is very tedious, costly, and time consuming.

When the panel is used as an outside skin for the car body, clamping may mar the outside surface of the panel and harm the final appearance of the car. Such panels are only located in a confined configuration with small clearances. The clearance between the panels and the confining mechanism must be minimized to maintain desired accuracy when allowance is made for panel distortion and mechanism inaccuracies. Manual adjustment and verification is again necessary.

Once the panels are located and clamped or confined to the desired relative positions, the assembly is usually transferred to other process equipment for permanent joining of all panels and components together. Spot welding is a common method of joining in automotive manufacturing. Bonding, fusion, and laser welding are also recognized joining methods of metals and other materials, such as composite polymeric materials.

The integrated subassembly is then unclamped, lifted off the fixtures, and transferred to other assembly locations to be integrated into another subassembly, or finally, the full car body.

Occasionally, robots and programmable devices are used for automating certain automotive body assembly processes such as spot welding and material handling. However, this has not generally extended to the location of the components handled or processed. An example of an exception is disclosed in U.S. Pat. No. 4,944,445. The '445 patent requires the presorting of assembly components and their placement at approximate locations on a specially designed pallet prior to being operated on. This requirement carries with it the inconvenience, cost, and space demands of a multitude of assembly pallets not much different from what is currently experienced with hard automation approaches.

The '445 patent also discloses programmable locators, described as tool carriers, and require that they be fitted with customized tools that are designed to fit the assembly, or the process, such that the assembled parts nest accurately on the tooling jaws.

This arrangement has the advantage over hard automation in that it requires only one set of accurate tooling that remains at the joining station of the parts instead of being duplicated with each pallet as is done with hard automation. However, as many pallets are needed as for hard automation. The locators are arranged in groups with each group constrained to move in common planes of motion, hence limiting flexibility to make re-adjustments after the components have been located on the tooling.

U.S. Pat. No. 4,641,819 discloses programmable devices which are positioned accurately for the intended location of parts and which have locating means which, by their location, define the location of the part. Programmable devices, conventionally known as robots, locate the parts. The device of the '819 patent has a set of locator gross adjustment means, and a set of locator fine adjustment means.

U.S. Pat. No. 4,821,408 discloses passive positioning means, or a jig, with holding means that can be moved by separate moving means.

U.S. Pat. No. 4,738,387 addresses an assembly station layout, stacking of parts, and storage of parts.

U.S. Pat. No. 4,811,891 discloses a method of two-wheeled vehicle assembly. Jigs are fixed as typical with hard automation. The '891 patent does not teach flexibility in adapting to differences in body, or frame, size, or to components of different shapes.

U.S. Pat. No. 4,960,969 discloses a conventional use of robots for the transfer of panels when combined with tool changing to allow robots to handle as well as process parts, such as by spot welding.

U.S. Pat. No. 4,691,905 discloses forming the mounting face of a part holder to the "form" of the part.

French Patent Document No. 2631-100-A discloses a positioner that moves a part after it has been clamped to it.

U.S. Pat. No. 4,894,901 addresses cooperative processing of one part by two robots, one for holding and one for processing.

U.S. Pat. No. 4,875,273 discloses a device which positions parts by fixed jigs. A robot moves the composite assembly.

U.S. Pat. No. 3,624,886 relates to conventional hard automation and component assembly methods using same.

Prior art fixtures generally must be tailored to specific models, sizes, and styles of car bodies. Different fixtures are required for each subassembly even when variations are small between car body styles. It is therefore necessary to build multiple fixtures whenever more than one body style is to be manufactured in the same production facility. With the proliferation of body sizes and styles in the auto industry, it is obvious that this approach imposes appreciable cost penalties on automotive manufacturers in several ways:

Initial investment in multiple dedicated fixtures.

Excessive demand on floor space to accommodate multiple fixtures, hence larger capital investment in plant buildings and facilities.

Replacement cost of fixtures whenever new models are introduced.

Idle plant capacity and lost sales opportunities whenever market demand shifts between car models; when idle capacity of low selling models cannot be readily used to manufacture hot selling ones.

Low product quality, hence less profits, as fixture adjustment shifts with use.

Inflexibility in accommodating design changes which may affect body location features, hence, less responsiveness to market demands and loss of sales.

The prior art generally follows a "hard automation" approach. Very few tooling systems have the capability to accommodate more than one panel unless the variations between panels are minor and are not related to the critical location features of the tooling. Occasionally, tooling may be designed with additional features that may accommodate one or more different panels, but this adds to the complexity, cost, and size of the tooling; and also detracts from its reliability. An example is shown in U.S. Pat. No. 4,256,947.

Because of this rigidity in application, current hard tooling fixtures must be changed with each model change. This translates into long lead time requirements for the introduction of new models, higher production cost for automobiles, slow response to market demands for new features, and in general, unfavorable competitive position for the auto manufacturer.

Furthermore, hard tooling is subject to misadjustment as locators shift in place with continuous use and frequent impact on the friction-held locators. This results in poorly located parts and the need for frequent adjustment. Since the adjustment is done by shimming and bolt clamping, this is a tedious process that cannot be done precisely and results in inconsistency in tooling and poor quality in products.

In the prior art, material handling is usually done manually or by dedicated material handling mechanisms. Panels are placed in the fixtures manually and may require the cooperative effort of two persons, especially for heavy or flimsy (pliable) parts that require multiple points of support. This is a tedious operation which reduces product quality as people become tired and damage panels by misplacement, dents, and abrasion. Dedicated placement and transfer mechanisms also have limited use as they occupy a permanent location and cannot usually be utilized to automate all candidate operations because of conflicting space requirements. The cost and space penalties associated with automating the placement and transfer of small components does not usually justify its application. Hence, such automation is usually limited to large and heavy parts and subassemblies. Therefore, full automation is generally impractical with the prior art.

SUMMARY OF THE INVENTION

It is an object of the present invention to provide a generic method and system for the mechanical assembly of components requiring the processing or joining of accurately located components by a material joining operation such as by mechanical fasteners, adhesive bonding, material fusion, welding (spot, arc, laser, E-beam, etc.), etc.

It is also an object of the invention to provide a flexible, generic, model independent, tooling method and system for automotive body assembly which is:

Flexible (i.e., accommodates a mix of body sizes, running design changes, and model changes);

Economical (i.e., provides appreciable cost savings over current hard automation systems despite its added benefits for being Model independent, and usable across model changes);

Efficient (i.e., gets tooling off the critical path of new model introduction programs, thus allowing faster new model introductions to the market, and quick retooling by program change instead of hardware fabrication);

Accurate (i.e., provides improvements in tooling accuracy and tooling consistency through programmability and adaptive tuning, and requiring less dependency on human judgment);

Consistent (i.e., always locates the body components in the desired location without manual adjustment, shimming, clamping, etc.; The location points do not change with frequent use);

Automatable (i.e., allows the automation of all processes associated with automotive body assembly such as material handling of large and small components, and panel placement, location, clamping, and joining).

In carrying out the above objects and other objects of the present invention, a method is disclosed for the flexible assembly of components into an assembly at an assembly station within an assembly area. The assembly station including a base and a plurality of programmable locators mounted at predetermined locations on the base to define a base coordinate frame. Each of the programmable locators is controlled by control means having a first set of programs to move under program control within a work envelope. The method includes the steps of: (a) receiving and supporting a component having at least one critical positioning feature by at least one of the programmable locators at an approximate location that is definable relative to the at least one critical positioning feature of the component; (b) adjusting the actual location of the component in the work envelope of its at least one programmable locator by controlling the at least one programmable locator to move the component from the approximate location under program control of one of the first set of programs such that the at least one critical positioning feature of the component is located at a desired location, hence, defining a desired location for the component; (c) retaining the component in the desired location at a plurality of retaining locations, the component having a position and an orientation in the desired location which are constrained at the retaining locations; and (d) repeating steps (a) through (c) for each component in the assembly, the components being constrained to allow process equipment to at least partially process the components to obtain the assembly.

Preferably, the method also includes the step of generating at least one location signal representing the actual location of at least one feature of one of the components in the base coordinate frame, wherein the one of the components of the assembly is moved based on the at least one location signal during the step of adjusting.

Further in carrying out the above objects and other objects of the present invention, a system is disclosed for the flexible assembly of components into an assembly in an assembly area. The system includes a assembly station including a base and a plurality of spaced programmable locators mounted at predetermined locations on the base to define a base coordinate frame. Each of the programmable locators has a work envelope and is adapted to receive and support a component having at least one critical positioning feature at an approximate location that is definable relative to the at least one critical positioning feature of the component. The system also includes control means having a first set of programs. Each of the programmable locators moves under program control within its work envelope to adjust the actual location of its component such that the at least one critical positioning feature of the component is located at a desired location, hence, defining a desired location of the component. Finally, the system includes means for retaining each of the components in its desired location at a plurality of retaining locations. Each of the components has a position and an orientation in its desired location which are constrained at its retaining locations. The components are constrained to allow process equipment to at least partially process the components to obtain the assembly.

Preferably, the system also includes means for generating a location signal representing the actual location of at least one critical positioning feature of one of the components in the base coordinate frame. One of the components is moved based on the location signal during adjustment of its actual location.

The advantages of the method and system of the present invention are numerous. For example, the method and system:

(1) Provide programmable location and support points which can be adjusted depending on the size, height, and other features of the component (panel) to be received, supported, and located.

(2) Receive the component within a space that provides high tolerance for component mislocation in position and orientation, hence, it allows the approximate location of the component by component delivery equipment, such as robots.

(3) Adjust the component accurately to a desired location after the component has been received at an approximate location.

(4) Sense the location of critical positioning features in space and provide necessary adjustment to the locators. This assures accurate location of critical positioning features relative to each other and corrects for part inaccuracies without affecting its intended function.

(5) Clamp or confine each component in its desired location.

(6) Allow for process equipment to partially join the components of an assembly, such as by spot welding or bonding, and maintain dimensional stability in preparation for further processing by other process equipment and complete joining.

(7) Allow for processing equipment, such as material joining, removal, and fastening robots, to perform desired processes while the assembled components are accurately located.

(8) Allow for the integration of process functions in common equipment, such as by using clamping tips for spot welding.

(9) Allow for modularization of the manufacturing process by integrating the fixtures with process tooling in one cell. Low volume manufacturing can then be done in limited floor space.

(10) Allow for material handling of components through flexible automation, such as with robotic devices. Hence, provide opportunity for full automation of the manufacturing process with all associated benefits in quality, consistency and higher reliability and uptime of production lines.

(11) Allow for the modularization of the location equipment, where the location and positioning devices can be all identical or made of common components; hence reduces cost, increases reliability and allows for ease of maintenance and service.

(12) Can be reconfigured for different components (panels) and transferred for use from one automotive model year to the next, or from one plant to another. For new models, only the spacial location of the modules on a platform may change to accommodate the new model geometry.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 14 is a schematic block diagram flow chart illustrating an automotive body assembly sequence utilizing the invention.

BEST MODE FOR CARRYING OUT THE INVENTION

The method and system of the invention is described hereinbelow in the course of its application to the assembly of a typical wheelhouse and quarter inner panel subassembly in a typical automotive body. However, it is to be understood that the method and system of the invention can be utilized to assemble a wide variety of assemblies which, in turn, can be assembled into yet other assemblies.

Figure 1:
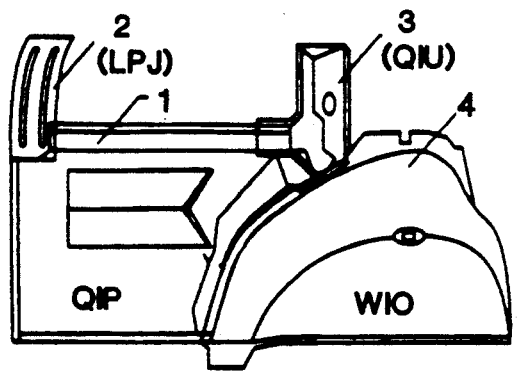
FIG. 1 is a schematic view of a wheelhouse and quarter inner panel subassembly capable of being assembled according to the method and system of the present invention.

The elements of the subassembly are shown in FIG. 1. A Quarter Inner Panel, QIP 1, is to be located and permanently joined to three other components, a Lock Pillar Inner, LPI 2, a Quarter Inner Upper, QIU 3, and a Wheelhouse Inner/Outer subassembly, WIO 4. This example is chosen to snow that the method applies for the assembly of panels into subassemblies, as well as for the assembly of a mix of panels, structural components, and subassemblies into larger subassemblies. Similarly, the method can be applied for the assembly of subassemblies (as components) into a complete car body assembly.

Figure 2:
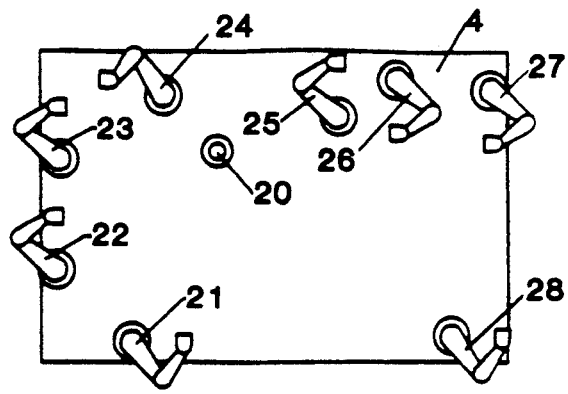
FIG. 2 is a top plan schematic view of an assembly platform of the system.

Referring to FIG. 2, the method and system include the use of programmable locators 20 through 28. These are robotic support devices that can be positioned under a first set of control programs to specific locations suitable for the support and positioning of mechanical components or panels. The locators are mounted on a platform 14, at an assembly station within an automotive assembly plant. The position of the locators is chosen to allow the components of an assembly to be mounted on at least three support points provided by the locators. The locators have the ability to position those support points within a defined work envelope representing the reach of each robot locator, and allow them to support panels and components of different sizes and configurations. Some locators may be fitted with clamps to secure the components in their accurate locations in preparation for subsequent joining processes.

The assembly operation using the method of the invention requires the placement of the subassembly components in a sequence with one component, the primary component, positioned first and accurately located and clamped. Other, or secondary, components are then sequentially positioned, located, and clamped relative to the primary component and to each other until the final assembly is complete. The assembly is then operated on by process equipment, such as robots, to join the assembly components permanently such as by spot welding or adhesive bonding. The processing may be done partially or totally at the assembly station, or the platform may be moved with the located and secured components, to a processing station. When the components are joined at the assembly station, some locators may be freed and repositioned to receive additional components, thus improving utilization of the locators.

Figure 3:
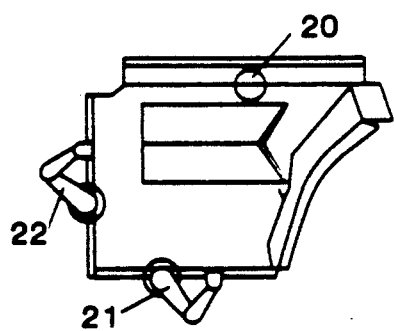
FIG. 3 is a schematic view illustrating a primary component location.
Figure 4:
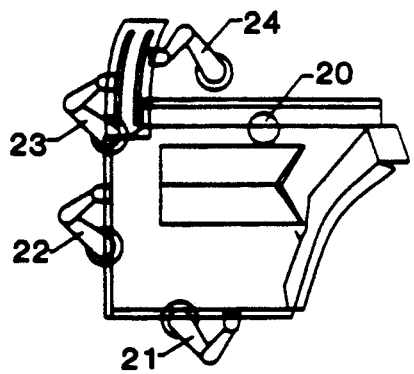
FIG. 4 is a schematic view illustrating a first secondary component location relative to the primary component.
Figure 5:
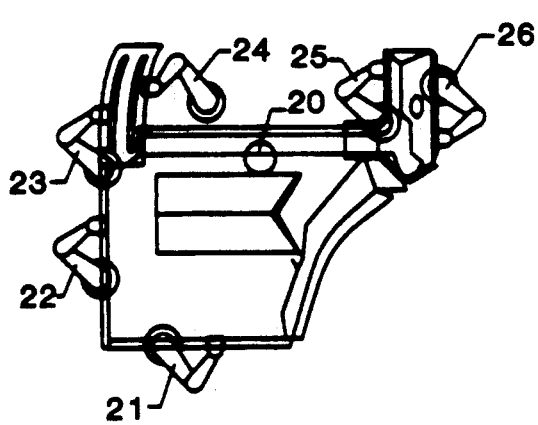
FIG. 5 is a schematic view illustrating a second secondary component location relative to the primary and first secondary components.
Figure 6:
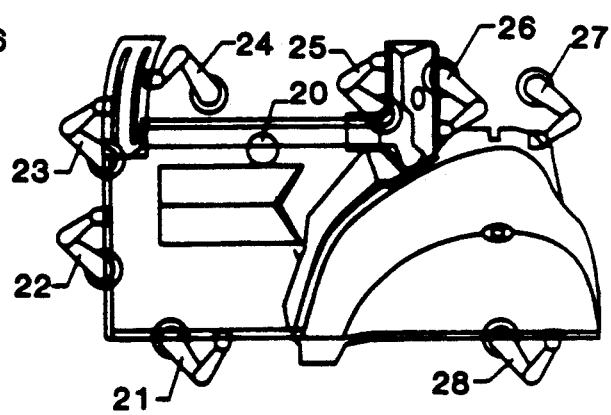
FIG. 6 is a schematic view illustrating a third secondary component location relative to the primary and first and second secondary components.

FIG. 3 shows the primary component, the QIP 1, of the wheelhouse subassembly positioned on locators 20, 21 and 22. FIG. 4 shows one secondary component, the LPI 2, located relative to the primary component by means of programmable locators 23 and 24 with the help of an extra support point available by nesting the LPI 2 with the QIP 1. FIGS. 5 and 6 show the other secondary components of the wheelhouse subassembly, the QIU 3 and the WIO 4, supported and located by programmable, robotic locators 25, 26 and 27, relative to the QIP 1 and to each other.

The programmable locators are not limited to providing only one point of support. End effectors, such as grippers carried by any one locator, can be designed to fully support and confine the workpiece (the panel) in as many as six degrees of freedom.

The following are special considerations applicable to each step in the location and processing sequence.

Support and Rough Location of the Primary Component: This is detailed in FIGS. 7 and 8. One component, preferably the heaviest or the most critical for integrity, accuracy, or functionality, may be chosen as the primary component for assembly. Other subassembly components are usually referenced or attached to the primary component. In this example, the primary component, panel 1, is located on at least three locators 5, 6 and 7. The locators 5, 6 and 7 are represented differently here from those of FIG. 2 to show other options available for the implementation of the invention. The three support locators 5, 6 and 7 are required to provide a stable support for the panel 1 when each provides a point of support. Fewer locators may be adequate if any of them provided a line or surface support for the panel 1 instead of a point support.

The primary component 1 is delivered to the assembly platform 14 either manually or by automatic material handling means, such as by robots. The delivery may provide only rough location for the primary panel 1. The locators 5, 6 and 7 may also support the panel 1 and be provided with means to guide its delivery to a better defined location. Guidance of the panel 1 may be provided by the constraints of a tapered pin guided into a hole, as shown for locator 5; or by providing the locator 6 with a sloped guiding surface 11 to constrain the side edges of the panel 1.

While for some applications locators 5, 6 and 7 may be fixed, in other applications a positionable locator may be desirable to accommodate complex component geometry. Positionable locators may be servo driven and continuously programmable, or discretely positioned to a limited number of known positions, such as by air cylinders. Though some locators may require several degrees of freedom for adjustment, others, especially support positioners, may be provided with adjustment in only one direction, such as for height adjustment.

Figure 7:
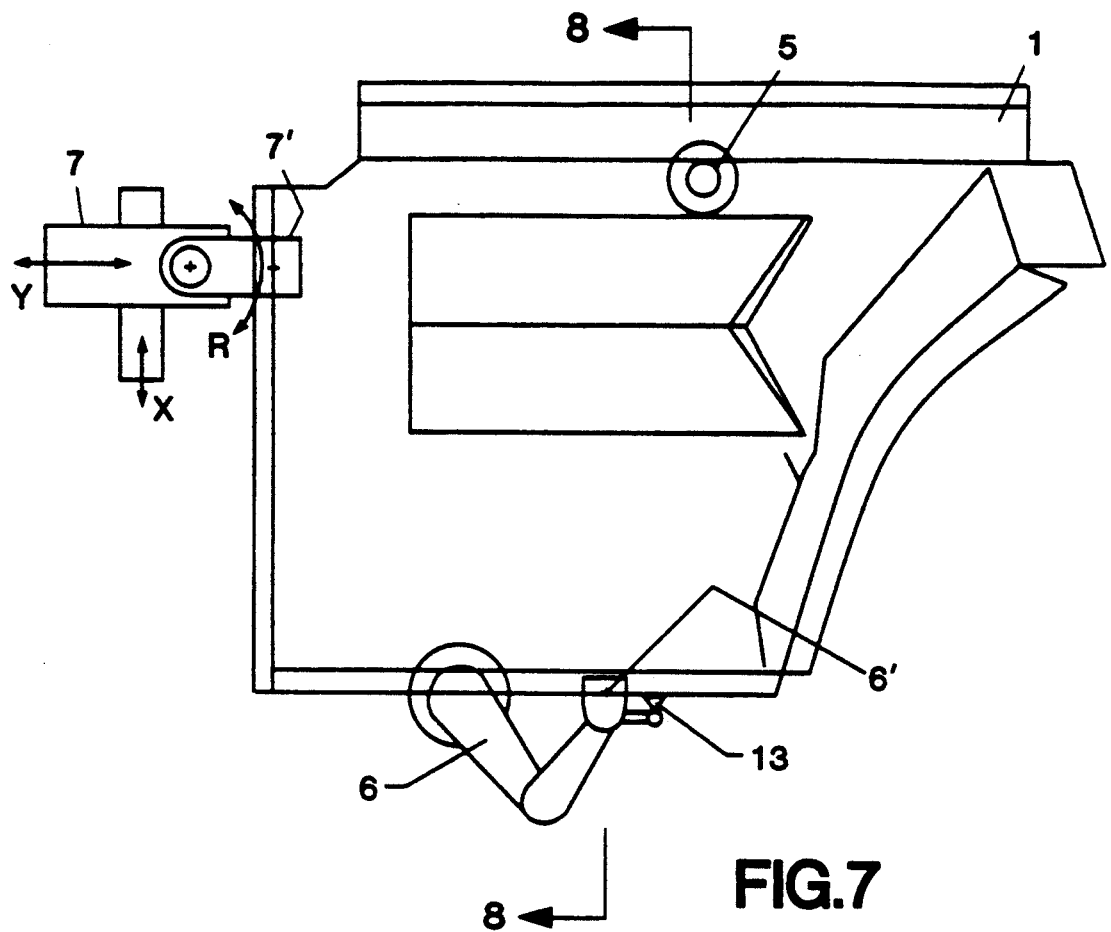
FIG. 7 is a schematic view similar to FIG. 3 illustrating particular types of programmable locators.

FIG. 7 shows different types of programmable locators. Locator 6 has an articulated arm construction allowing it three degrees of rotational freedom, while locator 7 is shown with two linear motions and one rotational motion.

Figure 8:
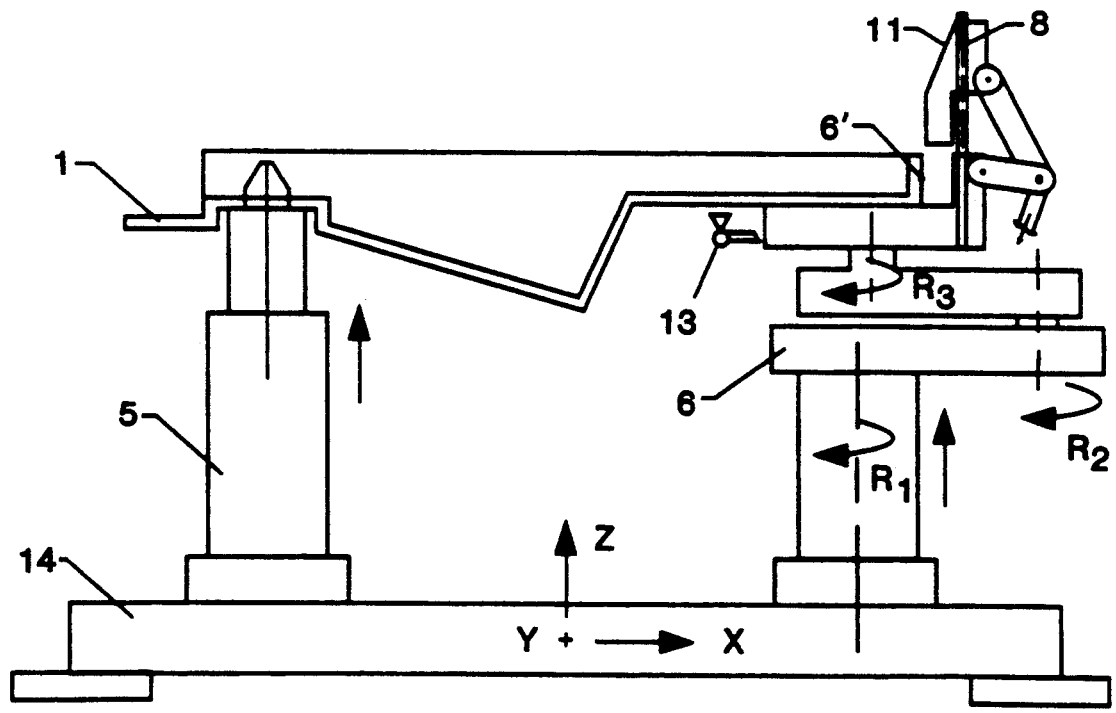
FIG. 8 is a sectional view taken along lines 8—8 in FIG. 7.
Figure 9:
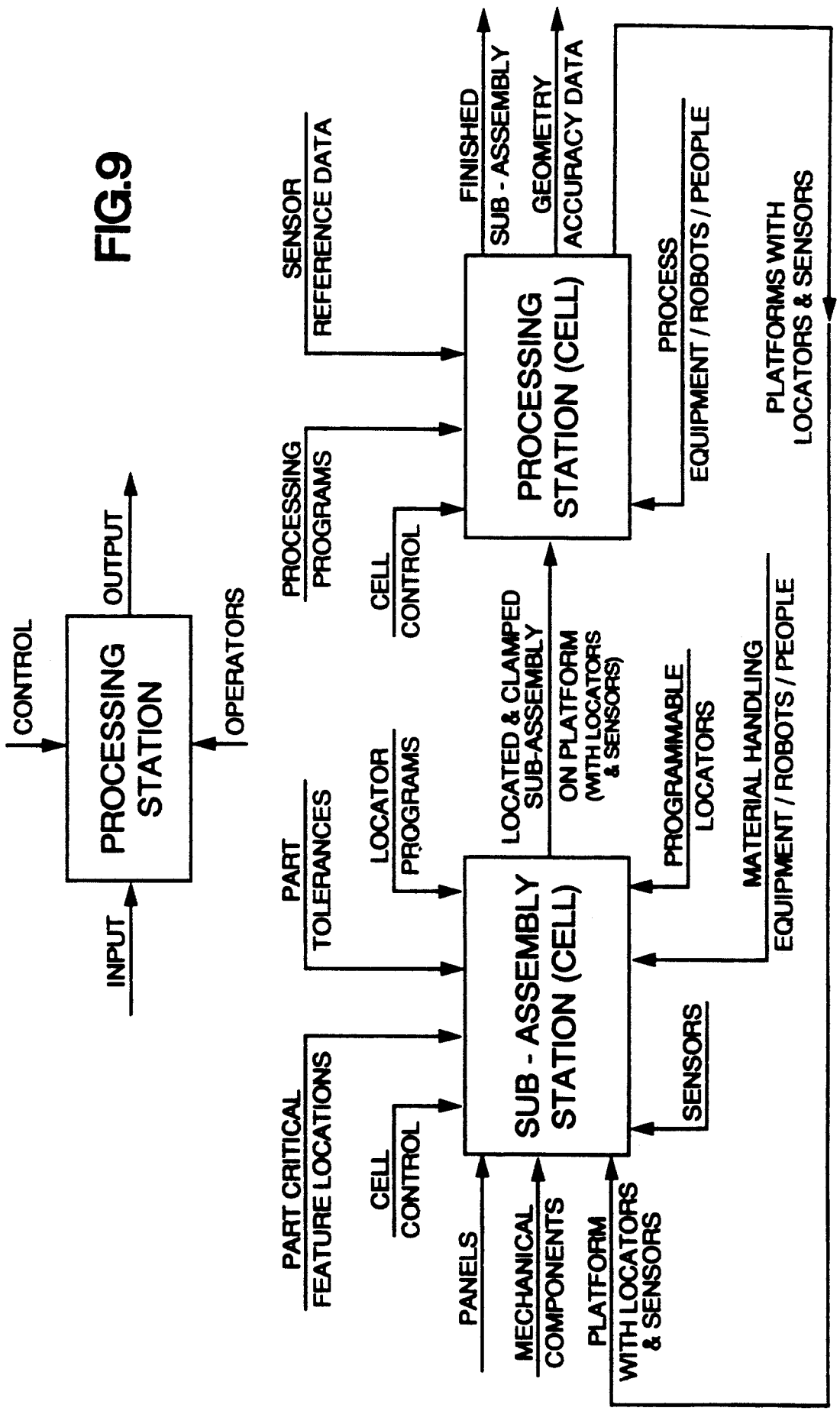
FIG. 9 is a schematic block diagram view of a first embodiment of the sequence of operations of the invention.
Figure 10:
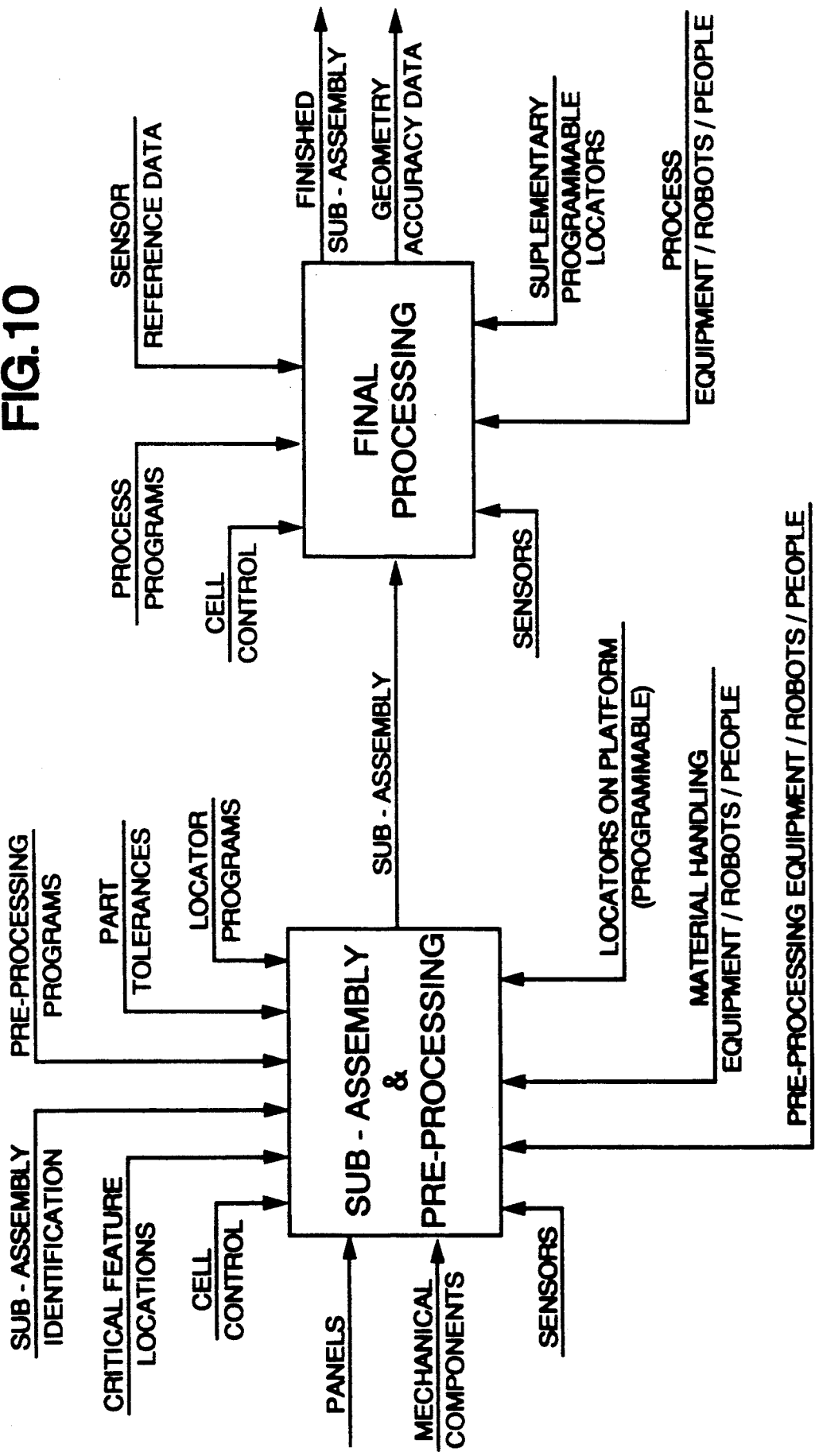
FIG. 10 is a schematic block diagram view of a second embodiment of the sequence of operations of the invention.
Figure 11:
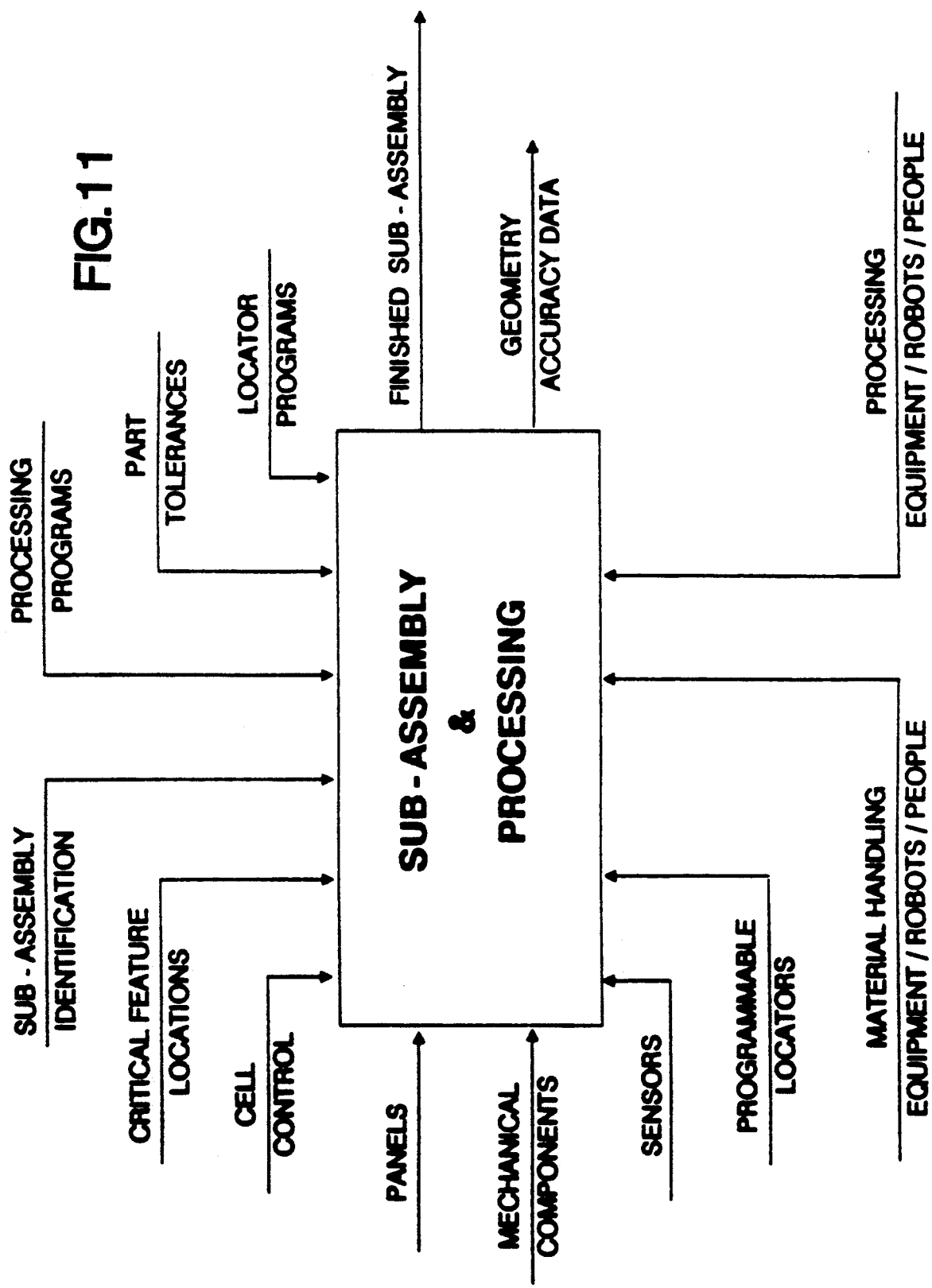
FIG. 11 is a schematic block diagram view of a third embodiment of the sequence of operations of the invention.
Figure 12:
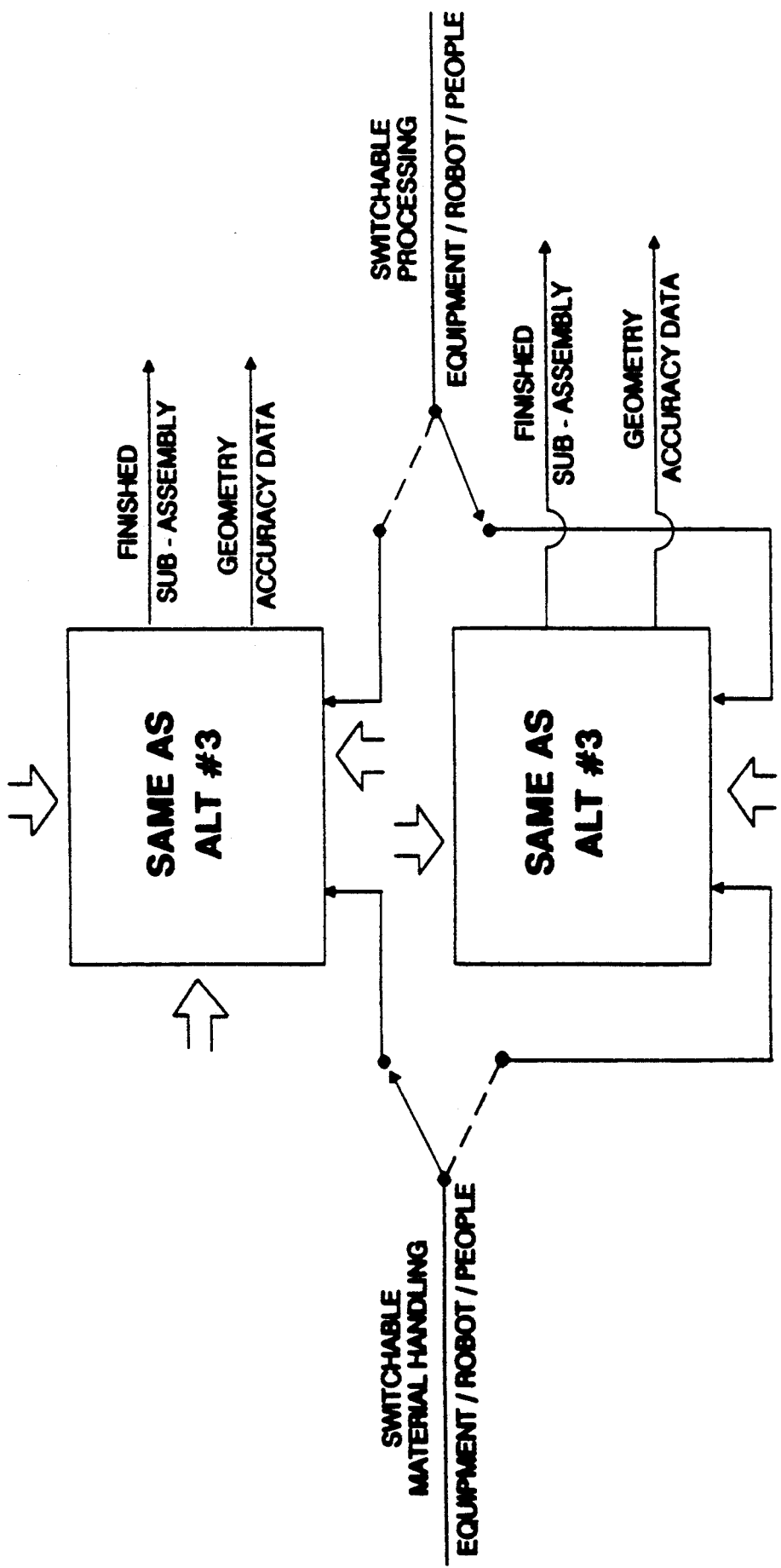
FIG. 12 is a schematic block diagram view of a fourth embodiment of the sequence of operations of the invention.

FIG. 8 also shows that one additional linear motion can be provided in the Z direction for any of the three locators 5, 6 and 7. It is obvious that the mechanical construction of the locators 5, 6 and 7 can have many configurations as long as it provides the necessary degrees of freedom of motion for the locator.

Precision Location and Clamping of the Primary Component: After the primary component 1 has been supported and roughly located on locators 5, 6 and 7, the programmable locators 6 and 7 approach the panel along predetermined paths under control of control programs and engage the panel 1 at location points such as 6' and 7', respectively. It is assumed that locator 5 is used as a fixed reference and fits closely, below its tapered end, into an accurate gage hole. The locators may, however, have programmability in the vertical direction. The control programs are selected according to the size and configuration of the panel 1. The paths allow the locators 6 and 7 to displace the panel 1 gently to its desired accurate location.

Six points of contact must typically be engaged to uniquely define the location and orientation of the panel 1 as it is displaced by the locators 6 and 7 in three degrees of freedom. Once located to the desired accurate location, clamps 8 are then activated to clamp on, or confine, the panel in that location. The clamps may be independently positioned, or, integrated with the stationary locator 5, or the programmable locators 6 and 7.

In another approach, the locators 5, 6 and 7 clamp the panel at its rough location, sense its critical positioning features, and then cooperatively move the panel to the desired location such that the critical positioning features are accurately located at their desired location. It is obvious that the algorithms of the controls program can be conventionally derived from the desired motion of the critical positioning features as constrained mathematically by the form of the component.

The clamps may be of the simple parallel jaw type, or may have specially shaped jaws, such as shown for the clamp 8 in FIG. 8, to accommodate special panel features without adversely affecting the flexibility or modularity of the system. When such flexibility cannot be accommodated, the programmable clamp/locators may be fitted with replaceable jaws as is well known in robotic applications using automatic hand changers. In that case, a rack (not shown) may be provided in the vicinity of the programmable clamp on which jaws of the desirable forms may be mounted. The jaws may be provided with special quick change devices that allow their attachment to, and detachment from, the programmable clamping device under program control.

The functions of rough location, support, accurate location and clamping can be combined into one device. For example, the programmable clamp/locator 6 of FIG. 8 is provided with a sloped surface 11 for guiding the panel 1 into a rough location. The locator 6 also supports the panel 1, is fitted with clamping jaws 8 and is programmable to provide accurate location and clamping. However, for some applications, the separation of function may be desired especially when the flexibility of production allows the use of fixed supports.

A fixed support, such as locator 5, may be used as a global reference for all locators on the platform 14, though it may also have height adjustment to accommodate panels of different geometries without losing its global reference status.

All locators, supports, and clamps are fixedly mounted on the rigid platform 14 which maintains a common coordinate reference frame X,Y,Z for all of the devices. The primary component 1 is constrained by the locators 5, 6 and 7 at a minimum of 6 points. Collectively, with appropriate spacial separation between the locators 5, 6 and 7, all six degrees of freedom of panel motion are constrained.

Secondary Component Placement: Once the primary component is located and clamped, other subassembly components may be placed on similarly installed positioners and locators, as described in relation to FIGS. 2, 3, 4 and 6. The locators are programmed to maintain a high level of accuracy for the relative location between subassembly components. This is assured by accurate calibration during the initial setting of the locators and the use of the common reference frame. However, higher accuracy and consistency may be attained by providing a set of position sensors 13, as illustrated in FIGS. 7 and 8. The sensors 13 measure and determine the location of the primary, as well as the secondary components in relation to the common coordinate reference frame of the platform 14.

It is conventional to electronically communicate the readings of the sensors to a microprocessor based controller device which in turn calculates the necessary location adjustment for each locator to accurately position the component as desired. The adjusted locations are then communicated to the controllers of the programmable locators as commands to move to the desired accurate locations. The sensor readings are used as a feedback signals to verify that the components are accurately located. The sensors 13 are preferably located to sense the most critical positioning features of the component. Critical features usually determine the quality of the car assembly including component fits, styling consistency, feature line matching, coordination of principal locating points, etc. Sensing and locating the critical positioning features with high accuracy relative to each other assures high product quality. Although six point sensing may be necessary for some components to correct for all possible mislocations, as few as one may be required for others having fewer critical positioning features.

Many types of sensors may be used for the determination of the accurate location of the components and the necessary locator adjustments. For example, proximity sensors may be used as they are simple and inexpensive. Vision cameras may also be strategically located to view critical positioning features on the components and accurately determine their locations and orientations. The information can then be fed back to the controllers of the programmable locators and their position adjusted accordingly. U.S. Pat. No. 4,707,647 assigned to the assignee of the present application and which is hereby incorporated by reference in its entirety, discloses such a vision method and system.

The critical positioning features may also be sensed away from the assembly platform, such as at an inspection station. Any deviations from the desired location of the critical positioning features of the final assembly, may be communicated, as digital data, to the programmable controller of the locators to effect necessary adjustments on the subassemblies that follows such an inspection.

In general, three programmable locators are required for each component. However, two may be adequate for secondary components, as shown in FIG. 4, when placed in contact with known features of adjacent components. It is customary to provide nesting surfaces between adjacent components in an assembly which provide two points of constraint equivalent to a third locator.

It is obvious that this method of location differs radically from most prior art as it has the ability to accommodate variations in part geometry and location. The programmable locators can be commanded from a central controller to move to any location, within their reach, suitable for the receipt and location of a variety of components. They can then be provided with programs to move towards the desired location of the critical positioning features as located by the sensors. Therefore, the locators can locate components to a desired theoretical location, as well as adapt to minor variations between components while maintaining an optimum location for the sensed critical positioning features.

Processing: Once located and clamped, the subassembly, the locators, and the whole platform may be moved to a process station having material joining equipment, such as robots, stud welding presses, etc., where the subassembly components are joined permanently. Another approach is to install processing equipment such as robots, at the assembly station where the equipment has access to the welding locations in the presence of the programmable locators.

Pre-Processing: In some operations, multiple parts are partially joined before moving on to a process station for complete joining. The assembly station may then be provided with material joining robots to provide spot welds, adhesives, etc., that can keep the components firmly attached at selected locations. It is also possible to fit the support locators with the process joining tools such as spot welding tips. In such cases, the locators may be positioned where adjacent components are joined. They may also be provided with rolling support elements to facilitate the travel of the welding equipment along the welded joints. Once joined, two adjacent components will require only three locators instead of six, thus freeing three locators to be used for the location of the next subcomponent. This approach minimizes the number of locators needed at any one assembly station and reduces cost.

In another processing approach, the programmable locators may cooperatively follow, or move ahead of the processing equipment to secure the components at locations as close as possible to the joining locations hence providing a more stable support for the components, and avoiding the need for and congestion of multiple locators and clamps.

Yet in still another variation, the locator's support points may represent an element of the processing equipment that moves cooperatively with mating elements of the processing equipment to provide support for the components and communicate the joining medium at the joining location. In particular, for the process of stud welding, a locator may provide a support point and function as the negative electrode for the process equipment which moves a positive electrode and provides the welding force and electric current cooperatively with the programmable locator.

Small parts may also lend themselves to another pre-processing operation. Instead of joining the small parts after placement and clamping, the invention allows the parts to be placed accurately by a material handling robot, and then joined by a processing robot, such as by spot welding, at the assembly station. The joining operation may be done completely, or partially, depending on the processing time available at any one station. If done partially, it is then completed in the following finish-processing station. With this approach, programmable clamp supports are avoided and their function replaced with the accurate placement capability of the material handling robot.

Panel and Component Handling: The subassembly components may be brought to the assembly system manually or, preferably, by automatic material handling means. For flexibility and compatibility, robotic devices which can be programmed in concert with the programmable tooling may be most suitable for panel and component handling. Conveyors may be used to bring the components and panels to the assembly station, stacks of parts may be brought to the assembly station by forklifts, automated guided vehicles, and the like; or, parts may be brought in bins and baskets for manual retrieval and handling. The parts may then be lifted from their delivery location, and deposited onto the assembly locators. When the parts are not delivered in an orderly manner, vision systems may be used to guide the robotic devices to predefined part grasping locations, or manual labor may be utilized.

Subassembly Delivery: Once all subcomponents are joined to the primary component or to each other, the composite subassembly may then be moved to the next processing station as another component of another subassembly, or as the final car body if no other major subassemblies are to be added. The subassembly may be lifted by robotic or other automation devices off the locating platform 14 and deposited on a material transfer device, such as a conveyor or an AGV, to be moved to the next processing station. The subassembly may be placed on other locating devices for transport to the next station. In some operations, it may be necessary to keep the subassembly in its clamped location, especially if it serves as the primary component for the next assembly operation. In this case, the whole platform 14 may be transferred with the locators and the subassembly to the next station and later returned once the subassembly is removed.

It should be noted that although this method may use an equivalent number of support and clamping locations for individual components as is used with conventional tooling systems, the total number utilized can be considerably less since the clamping devices need not stay with every subassembly as it moves from one assembly substation to the next, or as the subassembly is moved from the assembly station to the final processing station. Additionally, with the use of sensors, the number of location points can be minimized since the critical positioning features are maintained without the need for redundant locators as is the case with fixed fixtures.

Process Sequencing Alternatives:

Several options are available for sequencing the location and joining operations. Some of these options are described below as alternatives #1, #2, #3 and #4 and illustrated in FIGS. 9, 10, 11 and 12, respectively.

Alternative #1

Platform Transfer

The subassembly components are placed on the programmable locators and clamped in the assembly station. The locators are mounted on a platform which is then transferred to another station for processing. The integrated subassembly is then removed off the assembly platform 14 for transfer to the next assembly station. The assembly platform 14 is transferred back to the assembly station to receive the next set of components. Duplicate platforms would allow the concurrent utilization of the assembly and processing equipment.

Alternative #2

Subassembly Transfer

In this approach, the subassembly is preprocessed to permanently join its components at locations only adequate to maintain their integrity during transfer to the final processing station. The assembly platform 14 remains stationary, while the partially processed subassembly is transferred to the final processing station. This approach avoids the complexity and cost associated with the transfer mechanism of the heavy and complex assembly platform 14. However, it adds some processing equipment to the assembly station, and reduces the location and clamping requirements in the processing station. The assembly and processing equipment are utilized concurrently.

Alternative #3

Single Station Approach

The component location, clamping, and joining are all done in one station. This approach allows some concurrent operation of location and processing equipment but is likely to yield less production than the multiple station arrangements. The equipment cost, however, is less and can be duplicated to increase production.

Alternative #4

Parallel Processing

In this approach, two stations operate identically as the single station approach, (alternative #3). However, the placement and processing devices and robots alternate between stations that are placed within their common work space. The placement devices also transfer the finished subassemblies to the material transfer equipment, such as AGV's, conveyors, etc.

Figure 13:
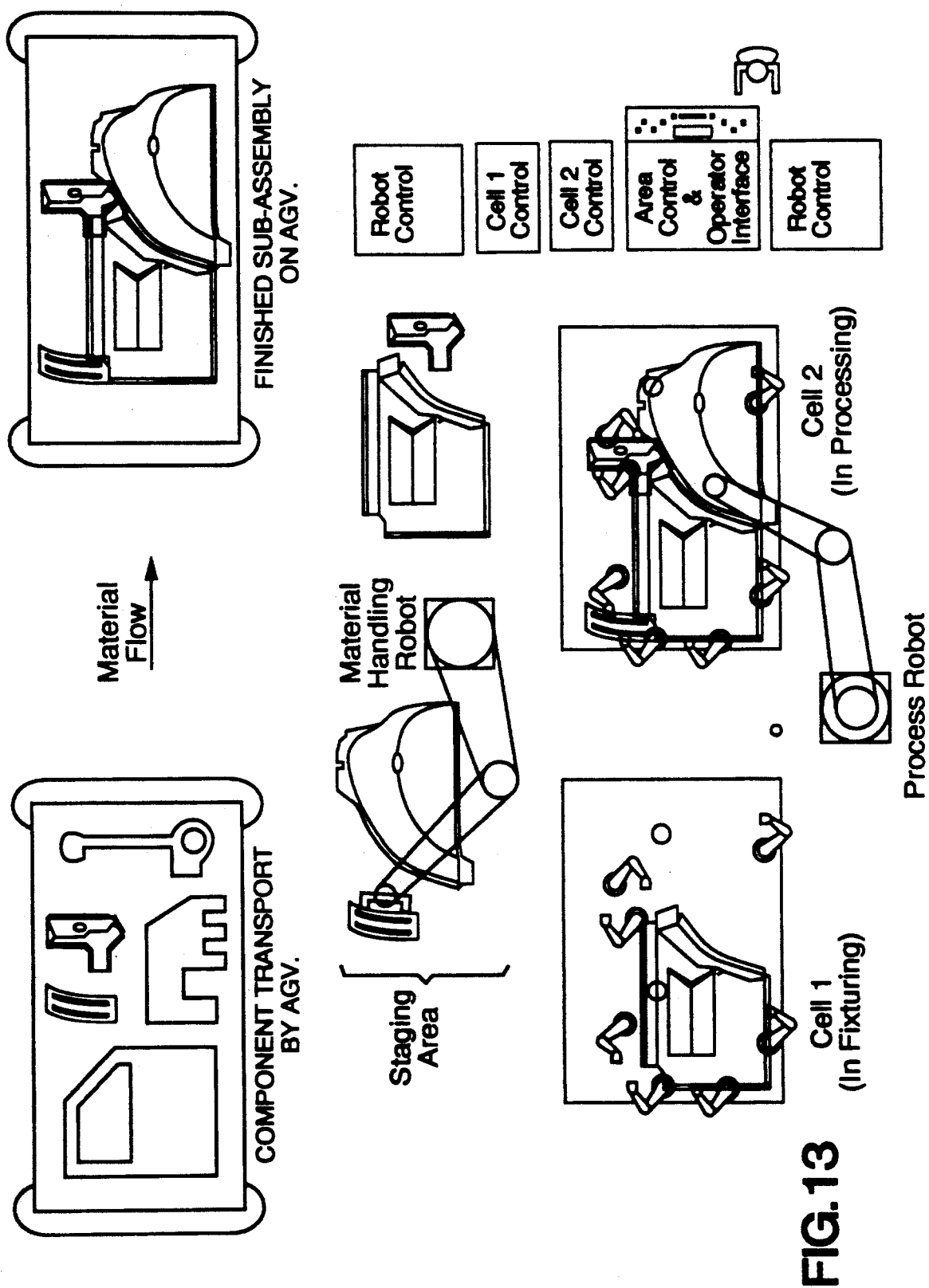
FIG. 13 is a schematic view of two cells with their controllers which illustrate the invention.

In FIG. 13, an extended application of the approach of Alternative #4 is shown where AGV's bring the components to the assembly station and pick-up finished subassemblies from the processing station. The components may be delivered in stacks, magazines, pallets, etc., to the assembly station. Either the AGV's transfer mechanism or a material handling robot transfers the components to a staging area adjacent to the assembly station. The material handling robot then places the components selectively on the programmable locator platform 14 where they are accurately located and clamped. The material handling robot then moves to load the second assembly station. Simultaneously, a processing robot moves to the located subassembly to finish the joining operation of all located components. Once processing is finished, the subassembly is unclamped, removed off the assembly platform, and transferred to an available AGV for transfer to the next assembly or processing station. The material handling robot then returns to load the vacant assembly platform 14 with new parts while the processing robot moves to operate on the other assembly/processing platform.

It is customary that station controllers be designed to communicate with each other and with other equipment controllers, as well as with other plant computers to assure the availability of components when needed. The timely transfer from the storage areas to the processing and assembly locations can thus be realized. This approach assures the continuity of the production operation and the uninterrupted utilization of the equipment by minimizing idle waiting time. Hence, once the staging area becomes low on parts, the area controller may communicate with the material storage controllers, at other areas of the plant, and request the delivery of the specific type and number of needed components. This is customarily done in automated manufacturing and is not elaborated on here. It is only mentioned here to demonstrate the ability to integrate the method and system of this invention in the technology of flexible manufacturing.

Arrangements are possible for alternative #4 other than that described herein. For example, the use of a rotary table allow one side to be used as an assembly station while the opposite side is used as a process station. A 180 degree rotation of the table reverses the function and delivers a newly located subassembly to a process robot and a finished subassembly to a material handling robot. The location of the components also need not be on a horizontal plane, though a plane with a horizontal component may be desirable to allow the use of gravity for rough location before clamping.

The staging area also need not be independent of the AGV's. For example, the AGV may be used as the staging area, hence avoiding the task of component transfer from the AGV to a staging area. Once the parts on the AGV are exhausted, the AGV may move and another brought in with necessary components. Appropriate scheduling and program timing would allow the AGV's to be called in as necessary to maintain continuity in production. The method of the invention thus applies as long as assembly stations are programmable to accommodate variations in parts and still provide accurate location and processing.

Automotive Body Assembly Sequence:

FIG. 14 shows the progression of building an automotive body from its components according to the invention. The base components are first grouped into subassemblies. Subassemblies are then combined with other subassemblies as well as individual components to form bigger and more complex subassemblies. The process continues until the last few subassemblies and components are combined into the final car body.

The method of the invention applies at each stage of the conventional process of FIG. 14 as it replaces fixed fixtures and tooling with programmable locators, as it integrates the flexible material handling and processing equipment, such as robots, into the process, and finally, as it coordinates the location and processing operations with the variations in production plan and running design changes.

At any stage of the body assembly sequence, any assembly station can be instructed to receive a different set of components and to operate on them by means of different programs as long as the locators have the appropriate work envelope to accommodate the new parts. With production flexibility in the automotive plants calling primarily for minor variations between model styles, (i.e., within inches), and the same assembly sequence, it is relatively easy to size the work envelope of the locators to accommodate a large variety of body styles and sizes. The process is thus flexible enough so that at any time the plant can switch from the production of one model to another as called for by market demands.

Design changes are also conveniently accommodated. Such changes may include changed panel features, size, or materials, and require different location points, which is an easy task to reprogram. This flexibility is impossible with the prior art methods and systems which cause considerable cost to manufacturers as they change expensive tooling to accommodate any of these possibilities. The manufacturers may even lose market share as they find the responsiveness too expensive to tolerate.

The method and system of the invention as described herein is not limited to the assembly of automotive bodies which are composed primarily of panels made of sheet metal, plastics or composites. Rather, the invention extends to all assembly operations that require the location of two or more components of an assembly, their clamping in an accurate relative location, and their joining by permanent or temporary joining processes. For example, it applies to the assembly of engines as well as printed circuit boards as long as the components of the assembly are placed on programmable locators for their accurate location and confinement relative to each other. The components are then joined by fasteners, adhesives, welding, etc.

While the best mode for carrying out the invention has been described in detail, those familiar with the art to which this invention relates will recognize various alternative designs and embodiments for practicing the invention as defined by the following claims.

What is claimed is:

1. A system for flexibly assembling components to form an assembly of the components at an assembly station in an assembly area, each of the components having at least one critical positioning feature and a plurality of support locations definable relative to the at least one critical positioning feature, the system comprising:

an assembly station including a base and a plurality of spaced programmable locators mounted and constrained at predetermined locations on the base to define a base coordinate frame, each of the programmable locators having a work envelope and being adapted to receive and support at least one of the components at one of said support locations of the at least one of the components wherein the components are cooperatively supported by the plurality of programmable locators at their respective initial support locations relative to the base coordinate frame;

control means having a first set of programs, each of the programmable locators moving independently under program control within said work envelope to adjust said respective support location of the components supported on said programmable locators from said respective initial support locations, wherein said programmable locators are independently adjusted by said first set of programs of said control means to locate the at least one critical positioning feature of each component at a desired position, hence defining a desired position of each component; and means for retaining each of the components in its desired position at a plurality of retaining locations, each of the components being constrained at said retaining locations relative to the base, the components being constrained to allow join equipment to at least partially process the compounds to obtain the assembly.

2. The system of claim 1 further comprising means for generating a location signal representing the actual location of the at least one critical positioning feature of one of the components in the base coordinate frame, wherein the one of the components is moved based on the location signal during adjustment of its actual location.

3. The system of claim 1 or claim 2 further comprising a processing station and means for moving the constrained components from the assembly station to the processing station, the processing station including the processing equipment to process the components.

4. The system of claim 1 or claim 2 wherein at least one of the retaining locations for a given component is provided by another component.

5. The system of claim 1 or claim 2 further comprising a processing station including the processing equipment, the processing station being coincident with the assembly station.

6. The system of claim 1 or claim 2 wherein at least one of the programmable locators has at least two degrees of freedom.

7. The system of claim 2 wherein the assembly station includes a reference locator for providing a global reference for the other locators.

8. The system of claim 7 wherein the reference locator is mounted at a predetermined location on the base.

9. The system of claim 2 wherein one of the programmable locators is a reference locator mounted at its predetermined location to at least partially define the base coordinate frame.

10. The system of claim 7 or claim 8 or claim 9 wherein the reference locator receives and supports the one of the components and wherein said means for generating includes means for sensing the location of the at least one critical positioning feature of the one of the components to provide at least one feedback signal.

11. The system of claim 10 wherein said control means includes means for processing the at least one feedback signal to obtain a processed signal, the processed signal being utilized to move the one of the components under control of its one of the first set of programs to its desired location.

12. The system of claim 9 further comprising a processing station and means for moving the base so that the constrained components are transferred to the processing station, the processing station including the process equipment for at least partially processing the components at the processing station.

13. The system of claim 9 further comprising means for partially processing the components together at a partial processing station including the process equipment and means for unloading the partially processed components from the base.

14. The system of claim 13 further comprising means for moving the unloaded, partially processed components to a finish processing station, the finish processing station including finish processing equipment to finish processing the components together.

15. The system of claim 2 wherein the means for generating includes at least one sensor for providing at least one feedback signal, the at least one feedback signal being utilized by the control means to generate the at least one location signal.

16. The system of claim 10 wherein the means for sensing includes at least one sensor, the at least one feedback signal being utilized by the control means to control at least one of the programmable locators.

17. The system of claim 1 or claim 2 wherein several of the plurality of programmable locators are adapted to receive and support one of the components at its approximate location and wherein the control means synchronizes the several of the plurality of programmable locators to effect a common displacement of the one of the components during adjustment of the actual location of the one of the components.

18. The system of claim 1 wherein at least one of the components is retained at its desired location by at least one of the plurality of programmable locators.

19. The system of claim 1 wherein at least one of the programmable locators moves its component along a programmed path provided by its one of the first set of programs to its desired location.

20. The system of claim 1 wherein at least one of the programmable locators retains its component in its desired location at at least one of its retaining locations.

21. The system of claim 7 wherein the reference locator is programmable.

22. The system of claim 15 wherein the at least one sensor is a camera mounted on one of the programmable locators.

23. The system of claim 15 wherein the at least one sensor is mounted on the programmable locator which moves the one of the components.

24. The system of claim 1 wherein at least one of the programmable locators both retains and processes its component in its desired location at at least one of its retaining locations.

25. The system of claim 12 or claim 13 wherein said control means causes said means for retaining to release at least one of the components at at least one of its plurality of retaining locations, the processed components being maintained in their desired locations at the remainder of the plurality of retaining locations.

26. The system of claim 1 wherein at least one of the programmable locators is a material handling robot.

27. The system of claim 1 wherein the process equipment includes a processing robot.

28. The system of claim 14 wherein said means for moving includes a material handling robot for picking up and placing the partially processed components in the finish processing station.

29. The system of claim 1 further comprising a material handling robot having a work envelope and means for storing at least one of the components within the work envelope of the material handling robot, the robot loading the at least one of the components to be supported by the programmable locators at the support locations of the components.

30. The system of claim 12 wherein the base is a rotary table and wherein the system further comprises means for rotating the rotary table to transfer the constrained components to the processing station from the assembly station.

31. The system of claim 1 or claim 9 or claim 12 or claim 30 wherein the base is a trapezoidal rotary table to reduce horizontal floor space requirements and allow gravity to at least partially locate at least one of the components at one of its support locations.

32. The system of claim 1 wherein the control means has a second set of programs different from the first set of programs and wherein the control means includes means for selecting one of the first and second sets of programs so that the plurality of programmable locators move their components under control of a selected set of the first and second sets of programs.

* * * * *